United States Patent
Fukui et al.

(10) Patent No.: US 9,896,087 B2
(45) Date of Patent: Feb. 20, 2018

(54) HYBRID VEHICLE AND CONTROL METHOD THEREFOR

(71) Applicant: Toyota Jidosha Kabushiki Kaisha, Toyota-shi, Aichi-ken (JP)

(72) Inventors: Keita Fukui, Fujinomiya (JP); Toshio Inoue, Gotemba (JP); Shunsuke Fushiki, Susono (JP); Tomoaki Honda, Gotemba (JP); Hidekazu Nawata, Gotemba (JP); Yuta Niwa, Mishima (JP); Taichi Osawa, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/115,379

(22) PCT Filed: Dec. 5, 2014

(86) PCT No.: PCT/JP2014/006081
§ 371 (c)(1),
(2) Date: Jul. 29, 2016

(87) PCT Pub. No.: WO2015/118595
PCT Pub. Date: Aug. 13, 2015

(65) Prior Publication Data
US 2017/0008511 A1    Jan. 12, 2017

(30) Foreign Application Priority Data

Feb. 4, 2014  (JP) ................................. 2014-019537

(51) Int. Cl.
*B60K 6/445*    (2007.10)
*B60W 10/26*    (2006.01)
(Continued)

(52) U.S. Cl.
CPC ............ *B60W 20/15* (2016.01); *B60K 6/445* (2013.01); *B60K 15/0406* (2013.01);
(Continued)

(58) Field of Classification Search
CPC ............ B60K 6/445; B60K 15/03504; B60K 15/0406; F02D 41/042; F02D 29/06;
(Continued)

(56) References Cited

U.S. PATENT DOCUMENTS 6,076,507 A * 6/2000 Blizard ................. F02D 33/006
                                                              123/198 DB
6,397,791 B1 * 6/2002 Brister ............... B60K 15/0406
                                                              123/198 D (Continued)

FOREIGN PATENT DOCUMENTS

EP    2 168 849 A1    3/2010
JP    2001-231106     8/2001
(Continued)

Primary Examiner — Yuri Kan
(74) Attorney, Agent, or Firm — Finnegan, Henderson, Farabow, Garrett & Dunner, LLP

(57) ABSTRACT

A vehicle is configured to perform external power supply which supplies electric power to outside of the vehicle. The vehicle includes a battery, an engine, a first MG configured to generate electric power using motive power of the engine, a fuel supply port for supplying a fuel for the engine, and an ECU for controlling an external power supply operation. When fuel supply into the fuel supply port is performed during the external power supply, the ECU prohibits driving of the engine, and supplies electric power stored in the battery to the outside of the vehicle.

5 Claims, 4 Drawing Sheets

(51) Int. Cl.

| | | |
|---|---|---|
| *B60W 20/15* | (2016.01) | |
| *B60L 1/00* | (2006.01) | |
| *B60W 10/06* | (2006.01) | |
| *B60W 30/18* | (2012.01) | |
| *B60L 7/14* | (2006.01) | |
| *B60L 11/12* | (2006.01) | |
| *B60L 11/14* | (2006.01) | |
| *B60L 11/18* | (2006.01) | |
| *B60L 15/20* | (2006.01) | |
| *B60K 15/04* | (2006.01) | |
| *B60W 20/00* | (2016.01) | |

(52) U.S. Cl.
CPC ............. *B60L 1/006* (2013.01); *B60L 7/14* (2013.01); *B60L 11/123* (2013.01); *B60L 11/14* (2013.01); *B60L 11/1816* (2013.01); *B60L 11/1818* (2013.01); *B60L 11/1861* (2013.01); *B60L 15/2009* (2013.01); *B60W 10/06* (2013.01); *B60W 30/18054* (2013.01); *B60L 2210/10* (2013.01); *B60L 2210/30* (2013.01); *B60L 2210/40* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/545* (2013.01); *B60L 2240/547* (2013.01); *B60L 2240/549* (2013.01); *B60L 2260/44* (2013.01); *B60W 20/00* (2013.01); *B60W 2530/00* (2013.01); *Y02T 10/6217* (2013.01); *Y02T 10/6239* (2013.01); *Y02T 10/645* (2013.01); *Y02T 10/705* (2013.01); *Y02T 10/7005* (2013.01); *Y02T 10/7044* (2013.01); *Y02T 10/7072* (2013.01); *Y02T 10/7077* (2013.01); *Y02T 10/7216* (2013.01); *Y02T 10/7241* (2013.01); *Y02T 10/7275* (2013.01); *Y02T 90/127* (2013.01); *Y02T 90/14* (2013.01); *Y10S 903/905* (2013.01)

(58) Field of Classification Search
CPC .... F02D 31/003; F02D 33/006; B60W 10/26; B60W 10/06; F02M 25/0809; B60L 11/1842
See application file for complete search history.

(56) References Cited

U.S. PATENT DOCUMENTS

| | | | | |
|---|---|---|---|---|
| 6,533,002 | B1* | 3/2003 | Kobayashi | B60K 15/03504 141/198 |
| 7,322,337 | B1* | 1/2008 | Brister | B60K 15/0406 123/198 D |
| 2001/0042534 | A1* | 11/2001 | Brister | B60K 15/0406 123/198 D |
| 2004/0201219 | A1* | 10/2004 | Kishibata | F02D 29/06 290/40 R |
| 2006/0011164 | A1* | 1/2006 | Kropinski | F02D 41/042 123/198 D |
| 2006/0089233 | A1* | 4/2006 | Sekita | F02D 31/003 477/84 |
| 2006/0287804 | A1* | 12/2006 | Takayanagi | F02M 25/0809 701/112 |
| 2008/0185197 | A1* | 8/2008 | Nakamura | B60K 6/445 180/65.28 |
| 2011/0139096 | A1* | 6/2011 | Niimi | B60K 6/445 123/2 |
| 2013/0184968 | A1* | 7/2013 | Kumano | B60L 11/1842 701/102 |
| 2015/0210179 | A1* | 7/2015 | Teraya | B60K 6/445 307/10.1 |
| 2016/0272194 | A1* | 9/2016 | Inoue | B60W 10/06 |

FOREIGN PATENT DOCUMENTS

| | | | | |
|---|---|---|---|---|
| JP | 2008-230293 | | 10/2008 | |
| JP | 2008-290577 | | 12/2008 | |
| JP | 2012-30668 | | 2/2012 | |
| JP | 2013-91377 | | 5/2013 | |
| JP | 2013091377 | A * | 5/2013 | ............ B60W 10/26 |
| JP | 2014-19338 | | 2/2014 | |

\* cited by examiner

HYBRID VEHICLE AND CONTROL METHOD THEREFOR

CROSS-REFERENCE TO RELATED APPLICATIONS

This application is a national phase application of International Application No. PCT/JP2014/006081, filed Dec. 5, 2014, and claims the priority of Japanese Application No. 2014-019537, filed Feb. 4, 2014, the content of both of which is incorporated herein by reference.

TECHNICAL FIELD

The present invention relates to a hybrid vehicle and a control method therefor, and particularly to a hybrid vehicle configured to perform external power supply which supplies electric power to the outside of the vehicle, and a control method therefor.

BACKGROUND ART

Hybrid vehicles configured to perform external power supply which supplies electric power to the outside of each vehicle have been known. Such a hybrid vehicle can supply not only electric power stored in a battery mounted in the vehicle, but also electric power generated by a motor using motive power of an engine.

When electric power is generated by driving an engine during external power supply, a fuel is consumed. Therefore, it has been proposed to perform fuel supply during external power supply to prevent an engine from running out of fuel. For example, the vehicle disclosed in Japanese Patent Laying-Open No. 2001-231106 is configured to introduce a fuel for driving an engine from the outside of the vehicle when a motor generates electric power. Thereby, the vehicle can perform external power supply for a long time.

CITATION LIST

Patent Literature

PTL 1: Japanese Patent Laying-Open No. 2001-231106

SUMMARY OF INVENTION

Technical Problem

When a fuel supply port is opened, a vaporized fuel (vapor) is emitted into the atmosphere. Therefore, when a fuel supply port is opened while an engine is driven, the concentration of the vapor drawn into the engine changes suddenly, which may cause a state where an appropriate air-fuel ratio cannot be maintained. As a result, there is a possibility that an engine combustion state may be deteriorated or an engine rotation speed may be significantly changed. Therefore, the vehicle disclosed in PTL 1 may not be able to stably perform external power supply during fuel supply.

The present invention has been made to solve the aforementioned problem, and one object of the present invention is to provide a hybrid vehicle capable of stably performing external power supply also during fuel supply.

Solution to Problem

A hybrid vehicle in accordance with an aspect of the present invention is configured to perform external power supply which supplies electric power to outside of the vehicle. The hybrid vehicle includes a power storage device, an internal combustion engine, a power generator configured to generate electric power using motive power of the internal combustion engine, a fuel supply port for supplying a fuel for the internal combustion engine, and a control device for controlling an external power supply operation. When fuel supply into the fuel supply port is performed during the external power supply, the control device prohibits driving of the internal combustion engine, and supplies electric power stored in the power storage device to the outside of the vehicle.

According to the above configuration, when fuel supply is performed during the external power supply, driving of the internal combustion engine is prohibited. That is, a fuel supply work is prevented from being performed simultaneously while the internal combustion engine is driven. When driving of the internal combustion engine is prohibited, it is not possible to supply the electric power generated by the power generator. However, according to the above configuration, the external power supply is continued by supplying the electric power stored in the power storage device. Since supply of the electric power stored in the power storage device is not influenced by fuel supply, the external power supply can be stably performed also during fuel supply.

Preferably, the hybrid vehicle further includes an openable and closable lid portion for the fuel supply port, and an operation unit configured to accept an operation for setting the lid portion in an opened state. When the operation unit accepts the above operation, the control device determines that the fuel supply into the fuel supply port will be performed.

According to the above configuration, since the fuel supply port is covered with the lid portion, it is necessary to set the lid portion in an opened state in order to supply the fuel into the fuel supply port. Whether or not the fuel supply will be performed can be determined reliably by detecting the operation for setting the lid portion for the fuel supply port in an opened state.

Preferably, when the operation unit accepts the above operation, the control device controls the lid portion such that the lid portion will be set in the opened state after the internal combustion engine stops.

In a case where the internal combustion engine has been driven, even if driving of the internal combustion engine is prohibited, it requires a certain time until the internal combustion engine actually stops. According to the above configuration, the lid portion is in a closed state until the internal combustion engine stops, and after the internal combustion engine stops, the lid portion is set in an opened state, and thus a fuel supply work can be performed. Therefore, a fuel supply work can be more reliably prevented from being performed while the internal combustion engine is driven.

Preferably, when the fuel supply into the fuel supply port is finished during the external power supply, the control device permits the driving of the internal combustion engine, and allows supply of the electric power generated by the power generator to the outside of the vehicle.

According to the above configuration, when the fuel supply is finished, the driving of the internal combustion engine is permitted, and supply of the electric power generated by the power generator using the motive power of the internal combustion engine can be resumed. Therefore, external power supply can be performed for a long time using the electric power generated by the power generator, without running out of fuel during the external power supply.

In a control method for a hybrid vehicle in accordance with another aspect of the present invention, the hybrid vehicle is configured to perform external power supply which supplies electric power to outside of the vehicle. The hybrid vehicle includes a power storage device, an internal combustion engine, a power generator configured to generate electric power using motive power of the internal combustion engine, and a fuel supply port for supplying a fuel for the internal combustion engine. The control method includes the steps of: determining whether or not fuel supply into the fuel supply port will be performed; prohibiting driving of the internal combustion engine when it is determined that the fuel supply into the fuel supply port will be performed during the external power supply; and supplying electric power stored in the power storage device to the outside of the vehicle when it is determined that the fuel supply into the fuel supply port will be performed during the external power supply.

According to the above method, when fuel supply is performed during the external power supply, driving of the internal combustion engine is prohibited. That is, a fuel supply work is prevented from being performed simultaneously while the internal combustion engine is driven. When driving of the internal combustion engine is prohibited, it is not possible to supply the electric power generated by the power generator. However, according to the above method, the external power supply is continued by supplying the electric power stored in the power storage device. Since supply of the electric power stored in the power storage device is not influenced by fuel supply, the external power supply can be stably performed also during fuel supply.

Advantageous Effects of Invention

According to the present invention, external power supply can be stably performed also during fuel supply.

DESCRIPTION OF EMBODIMENTS

Figure 1:
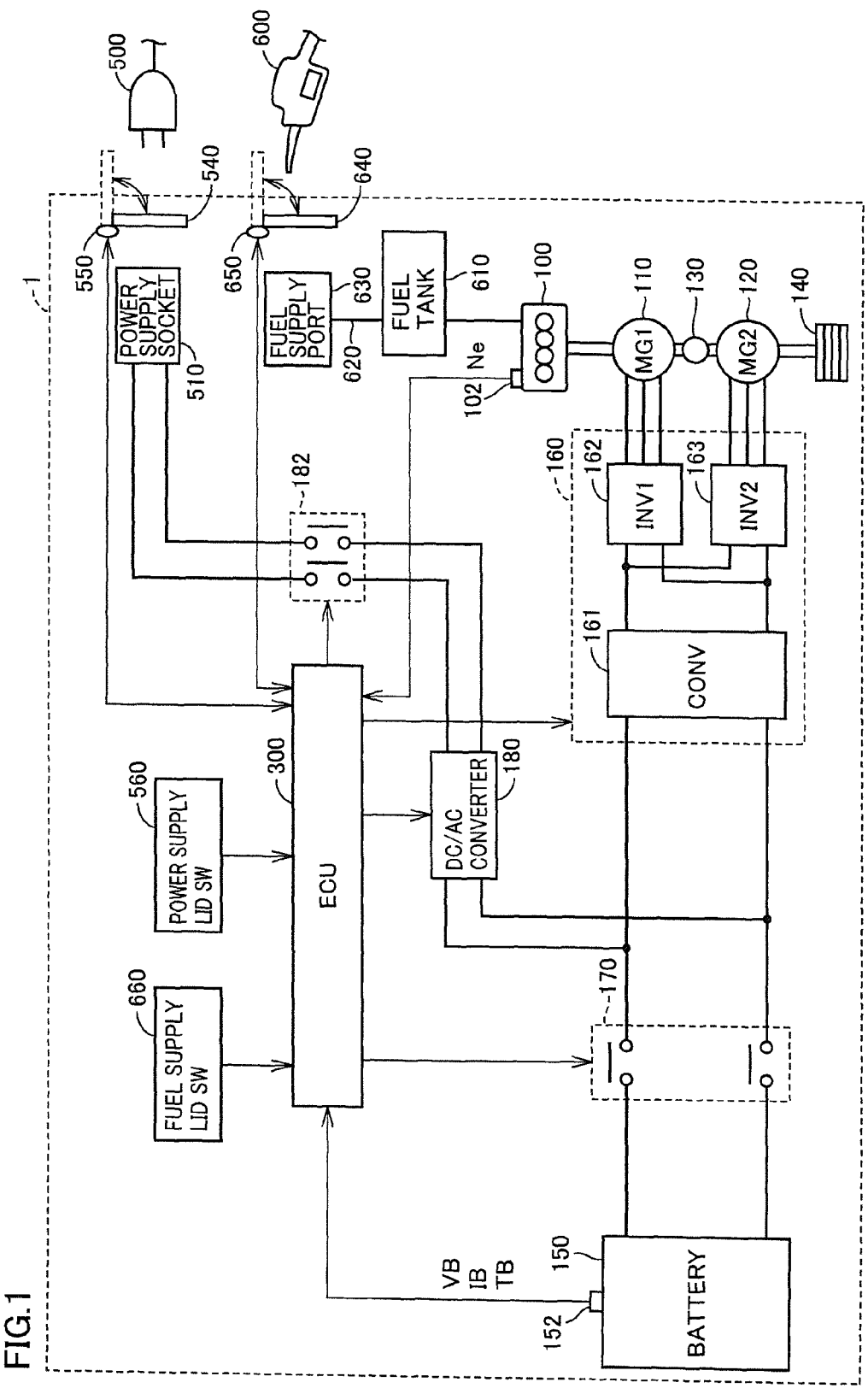
FIG. 1 is a block diagram schematically showing a configuration of a vehicle in accordance with the present embodiment.

Hereinafter, an embodiment of the present invention will be described in detail, with reference to the drawings. It is noted that identical or corresponding parts in the drawings will be designated by the same reference numerals, and the description thereof will not be repeated.

FIG. 1 is a block diagram schematically showing a configuration of a vehicle in accordance with the present embodiment. Referring to FIG. 1, a vehicle 1 is a hybrid vehicle configured to perform power supply to the outside of the vehicle (i.e., external power supply). Vehicle 1 includes an engine 100, a first MG (Motor Generator) 110, a second MG 120, a motive power split device 130, drive wheels 140, a battery 150, a PCU (Power Control Unit) 160, an SMR (System Main Relay) 170, and an ECU (Electronic Control Unit) 300.

ECU 300 (control device) controls devices such that vehicle 1 will be set in a desired state, based on signals transmitted from sensors, and maps and programs stored in a ROM (Read Only Memory, not shown), as described later.

Battery 150 (power storage device) is a direct current (DC) power source configured to be chargeable and dischargeable. As battery 150, for example, a secondary battery such as a nickel-hydrogen battery or a lithium ion battery, or a capacitor such as an electric double layer capacitor can be adopted.

Battery 150 is provided with a battery sensor 152. Battery sensor 152 comprehensively indicates a voltage sensor, a current sensor, and a temperature sensor (all not shown) provided to battery 150. The voltage sensor detects a voltage VB of battery 150. The current sensor detects a current IB input into or output from battery 150. The temperature sensor detects a temperature TB of battery 150. Each sensor outputs a signal indicating a detection result thereof to ECU 300.

SMR 170 is electrically connected between battery 150 and PCU 160. SMR 170 is controlled by ECU 300 to switch between supply and shutoff of electric power between battery 150 and PCU 160.

PCU 160 drives first MG 110 and second MG 120. PCU 160 has a converter 161 and inverters 162, 163. Converter 161 boosts a DC voltage supplied from battery 150, based on a control signal from ECU 300. The boosted DC voltage is supplied to inverters 162, 163. Inverter 162 converts DC power from converter 161 into alternating current (AC) power, and supplies the AC power to first MG 110, based on a control signal from ECU 300. Similarly, inverter 163 converts the DC power from converter 161 into AC power, and supplies the AC power to second MG 120, based on a control signal from ECU 300.

First MG 110 rotates a crankshaft (not shown) using the AC power from PCU 160. Thereby, engine 100 is driven. Further, a drive force of first MG 110 is transmitted to drive wheels 140 via motive power split device 130. Furthermore, first MG 110 generates electric power using motive power of engine 100 split by motive power split device 130. Generated AC power is converted into DC power by PCU 160, and is stored in battery 150. That is, first MG 110 corresponds to a "power generator".

Second MG 120 provides a drive force to drive wheels 140, using at least one of the AC power from PCU 160 or the AC power from first MG 110. Further, second MG 120 generates electric power by regenerative braking. The generated electric power is converted into DC power by PCU 160, and is stored in battery 150.

Engine 100 is an internal combustion engine such as, for example, a gasoline engine or a diesel engine. Engine 100 is provided with an engine rotation speed sensor 102. Engine rotation speed sensor 102 detects an engine rotation speed Ne, and outputs a signal indicating a detection result thereof to ECU 300.

A fuel tank 610 is connected to engine 100. Fuel tank 610 stores a fuel for engine 100, such as gasoline, ethanol (liquid fuel), or propane gas (gas fuel). Fuel tank 610 is connected to a fuel supply port 630 for supplying the fuel for engine 100, through a fuel pipe 620. When the fuel is supplied, a fuel supply nozzle 600 is inserted into fuel supply port 630.

Fuel supply port 630 is covered with a fuel supply lid 640 (lid portion) provided closer to the outside of the vehicle than fuel supply port 630. Opening and closing of fuel supply lid 640 is controlled by a fuel supply lid actuator 650 operated by a control signal from ECU 300. Fuel supply lid actuator 650 is provided with a sensor (not shown). This sensor detects an opened/closed state of fuel supply lid 640, and outputs a signal indicating a detection result thereof to ECU 300.

A fuel supply lid switch 660 (operation unit) is a switch for allowing a driver to select whether to set fuel supply lid 640 in an opened state or a closed state. In other words, fuel supply lid switch 660 accepts an operation for setting fuel supply lid 640 in an opened state. When fuel supply lid switch 660 is turned on, fuel supply lid switch 660 outputs, to ECU 300, a signal indicating that the driver has selected to set fuel supply lid 640 in an opened state. On the other hand, when fuel supply lid switch 660 is turned off, fuel supply lid switch 660 outputs, to ECU 300, a signal indicating that the driver has selected to set fuel supply lid 640 in a closed state.

Vehicle 1 further includes a DC/AC converter 180, a relay 182, and a power supply socket 510, as components for external power supply.

DC/AC converter 180 converts DC power from battery 150 or PCU 160 into AC power, based on a control signal from ECU 300. The converted AC power is supplied to power supply socket 510. Relay 182 is electrically connected between DC/AC converter 180 and power supply socket 510. Opening and closing of relay 182 is controlled by ECU 300.

When external power supply is performed, an external device 500 is electrically connected to power supply socket 510. Electric power from vehicle 1 is supplied from power supply socket 510 to external device 500. It is noted that, although external device 500 is, for example, an electric device, an electric facility, or a vehicle other than vehicle 1, external device 500 is not particularly limited as long as it operates upon receiving the electric power from vehicle 1.

Power supply socket 510 is covered with a power supply lid 540 provided closer to the outside of the vehicle than power supply socket 510. Opening and closing of power supply lid 540 is controlled by a power supply lid actuator 550 operated by a control signal from ECU 300. Power supply lid actuator 550 is provided with a sensor (not shown). This sensor detects an opened/closed state of power supply lid 540, and outputs a signal indicating a detection result thereof to ECU 300.

A power supply lid switch 560 is a switch for allowing the driver to select whether to set power supply lid 540 in an opened state or a closed state. When power supply lid switch 560 is turned on, power supply lid switch 560 outputs, to ECU 300, a signal indicating that the driver has selected to set power supply lid 540 in an opened state. On the other hand, when power supply lid switch 560 is turned off, power supply lid switch 560 outputs, to ECU 300, a signal indicating that the driver has selected to set power supply lid 540 in a closed state.

In vehicle 1 configured as described above, one or both of the electric power stored in battery 150 and the electric power generated by first MG 110 using the motive power of engine 100 can be supplied to the outside of the vehicle.

When the electric power stored in battery 150 is supplied, both SMR 170 and relay 182 are closed. Thereby, the electric power of battery 150 is supplied to external device 500, through a path from battery 150, SMR 170, DC/AC converter 180, relay 182, to power supply socket 510. Hereinafter, this path will also be referred to as a "first supply path (or supply path from battery 150)".

On the other hand, when the electric power generated by first MG 110 by driving engine 100 is supplied, SMR 170 is opened and relay 182 is closed. Thereby, the electric power generated by first MG 110 is supplied to external device 500, through a path from first MG 110, PCU 160, DC/AC converter 180, relay 182, to power supply socket 510. Hereinafter, this path will also be referred to as a "second supply path (or supply path from engine 100)".

Figure 2:
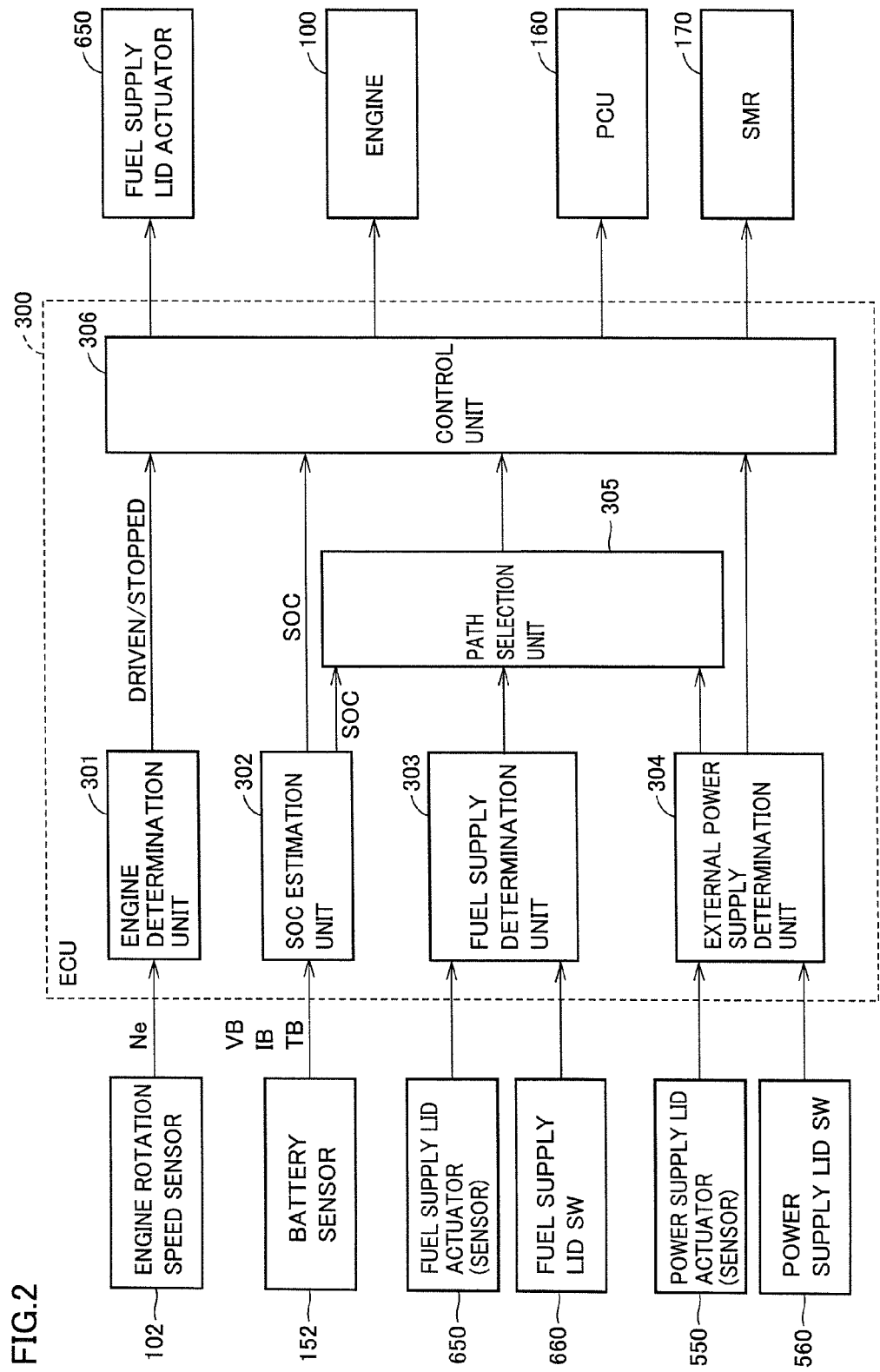
FIG. 2 is a functional block diagram of an ECU 300 shown in FIG. 1.

FIG. 2 is a functional block diagram of ECU 300 shown in FIG. 1. Referring to FIG. 2, ECU 300 includes an engine determination unit 301, an SOC estimation unit 302, a fuel supply determination unit 303, an external power supply determination unit 304, a path selection unit 305, and a control unit 306.

Engine determination unit 301 determines whether engine 100 is in a driven state or in a stopped state, based on engine rotation speed Ne detected by engine rotation speed sensor 102. Further, engine determination unit 301 outputs a determination result thereof to control unit 306.

SOC estimation unit 302 estimates the SOC of battery 150, based on voltage VB, current IB, and temperature TB of battery 150 detected by battery sensor 152. Further, SOC estimation unit 302 outputs an estimated value of the SOC to path selection unit 305 and control unit 306. It is noted that, since various well-known methods can be adopted as a method for estimating the SOC, a detailed description is not repeated here.

Fuel supply determination unit 303 determines whether or not fuel supply into fuel supply port 630 will be performed, based on a signal from at least one of the sensor of fuel supply lid actuator 650 and fuel supply lid switch 660. More specifically, fuel supply determination unit 303 determines that fuel supply will be performed, when the signal from the sensor of fuel supply lid actuator 650 indicates that fuel supply lid 640 is in an opened state, or when fuel supply lid switch 660 is ON. On the other hand, fuel supply determination unit 303 determines that fuel supply will not be performed, when the signal from the sensor of fuel supply lid actuator 650 indicates that fuel supply lid 640 is in a closed state, or when fuel supply lid switch 660 is OFF. Fuel supply determination unit 303 outputs a determination result thereof to path selection unit 305.

External power supply determination unit 304 determines whether or not external power supply will be performed, based on a signal from at least one of the sensor of power supply lid actuator 550 and power supply lid switch 560. More specifically, external power supply determination unit 304 determines that external power supply will be performed, when the signal from the sensor of power supply lid actuator 550 indicates that power supply lid 540 is in an opened state, or when power supply lid switch 560 is ON. On the other hand, external power supply determination unit 304 determines that external power supply will not be performed, when the signal from the sensor of power supply lid actuator 550 indicates that power supply lid 540 is in a closed state, or when power supply lid switch 560 is OFF. External power supply determination unit 304 outputs a determination result thereof to path selection unit 305 and control unit 306.

Path selection unit 305 selects one or both of the first and second supply paths as a supply path(s), based on the determination results of fuel supply determination unit 303 and external power supply determination unit 304. This selection method will be described in detail later. Path selection unit 305 outputs a selection result thereof to control unit 306.

It is noted that path selection unit 305 may further use the estimated value of the SOC estimated by SOC estimation unit 302, to select a supply path. For example, path selection unit 305 may be configured to select the first supply path when the estimated value of the SOC is more than or equal to a predetermined threshold value, and to select the second supply path when the estimated value of the SOC is less than the threshold value.

Control unit 306 controls the devices (engine 100, PCU 160, SMR 170, fuel supply lid actuator 650, and the like) such that electric power will be supplied from the supply path selected by path selection unit 305.

Figure 3:
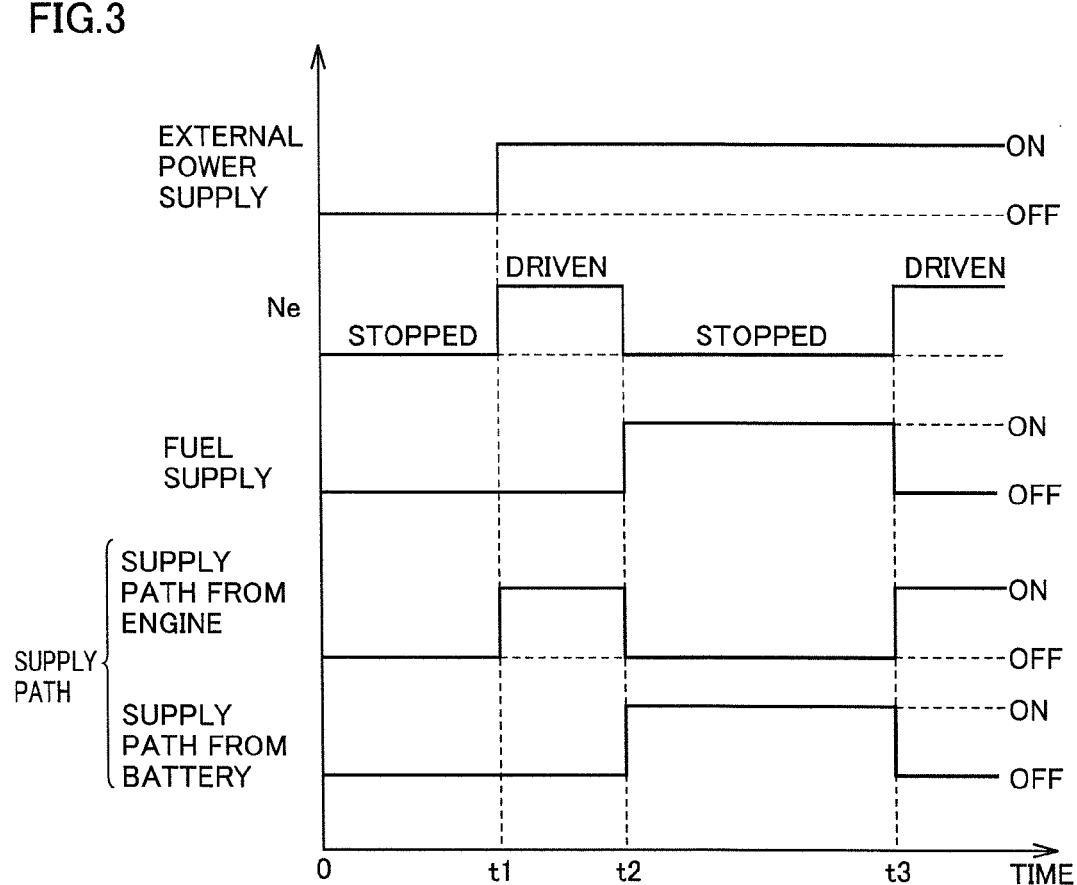
FIG. 3 is a timing chart showing an example of processing performed when a fuel is supplied in the present embodiment.

FIG. 3 is a timing chart showing an example of processing performed when the fuel is supplied in the present embodiment. Referring to FIG. 3, the axis of abscissas is a time axis. The axis of ordinates represents the presence or absence of external power supply, engine rotation speed Ne, the presence or absence of fuel supply, and selected supply paths.

At the start time (time 0), although vehicle 1 stops, external power supply is not performed. Accordingly, engine 100 is stopped, and neither the first supply path (supply path from battery 150) nor the second supply path (supply path from engine 100) is selected. Further, fuel supply is not performed, either.

At time t1, external power supply is started. Thereby, for example, when the SOC of battery 150 is lower than the predetermined threshold value, engine 100 is driven and the second supply path is selected. It is noted that it is also possible to charge battery 150 while performing external power supply.

When an operation for setting fuel supply lid 640 in an opened state is performed and supply of the fuel is started at time t2, driving of engine 100 is prohibited, and selection of the second supply path is prohibited. Thereby, engine 100 is stopped, and the supply path is switched from the second supply path to the first supply path.

When supply of the fuel is finished and an operation for setting fuel supply lid 640 in a closed state is performed at time t3, driving of engine 100 is permitted, and selection of the second supply path is permitted. Thereby, engine 100 is driven, and the supply path is switched from the first supply path to the second supply path.

However, it is not necessary to drive engine 100 and to switch the supply path to the second supply path when fuel supply is finished (see time t3). That is, also after fuel supply is finished, engine 100 may be maintained in a stopped state, and power supply from battery 150 may be continuously selected.

Figure 4:
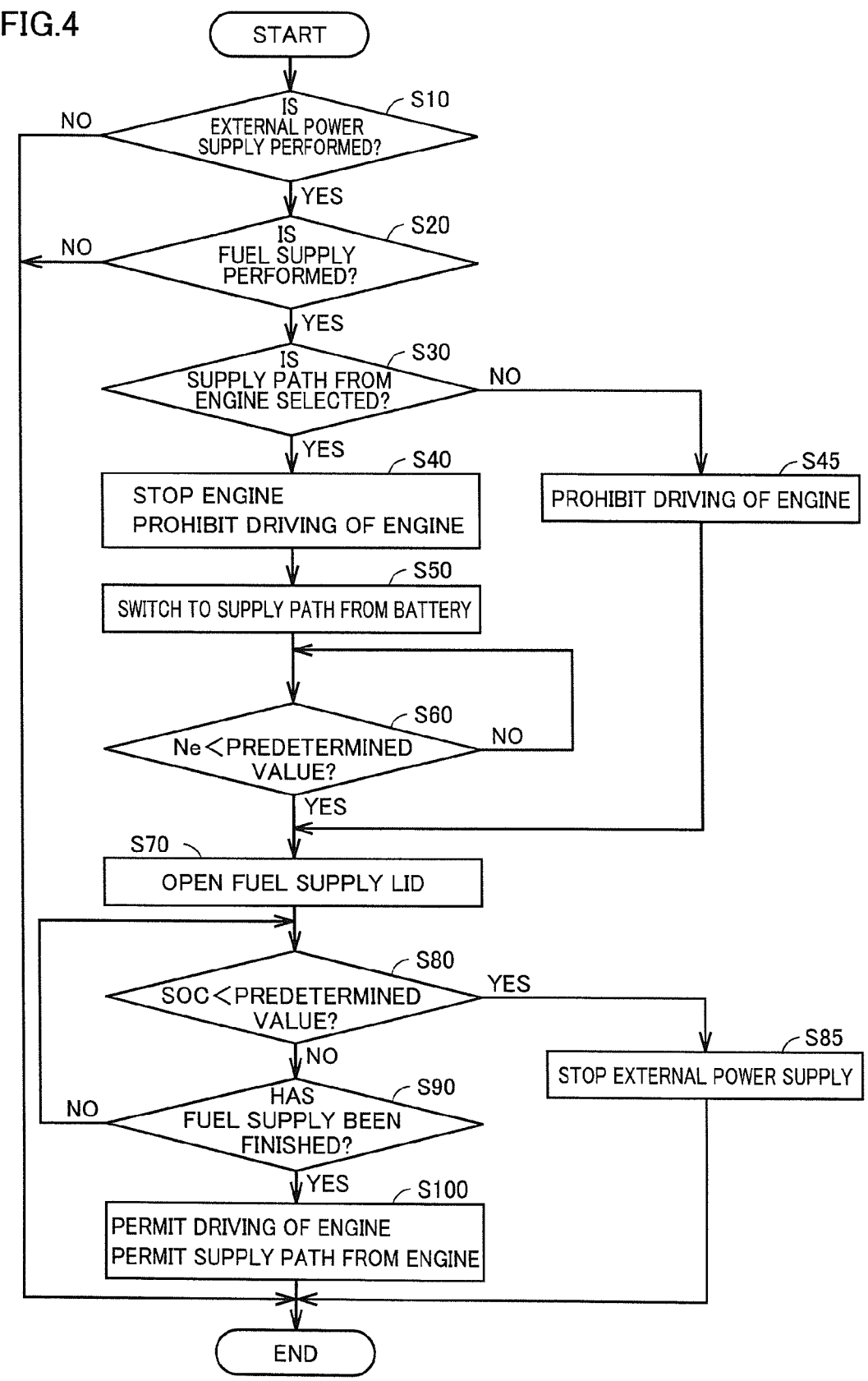
FIG. 4 is a flowchart showing the processing performed when the fuel is supplied in the present embodiment.

FIG. 4 is a flowchart showing the processing performed when the fuel is supplied in the present embodiment. Referring to FIG. 4, the processing in this flowchart is performed whenever a predetermined condition is satisfied or a predetermined time period elapses. It is noted that, although each step of the flowchart shown in FIG. 4 is basically implemented by software processing by ECU 300, it may be implemented by hardware processing by electronic circuitry fabricated within ECU 300.

In step S10, ECU 300 determines whether or not external power supply will be performed (or whether or not external power supply is already performed) (see, for example, time t1 in FIG. 3). ECU 300 can determine that external power supply will be performed, for example when power supply lid switch 560 accepts an operation, or when power supply lid 540 is in an opened state. When external power supply is performed (YES in step S10), the processing proceeds to step S20.

In step S20, ECU 300 determines whether or not supply of the fuel will be performed (see, for example, time t2 in FIG. 3). ECU 300 can determine that fuel supply will be performed, for example when fuel supply lid switch 660 accepts an operation, or when fuel supply lid 640 is in an opened state. When fuel supply is performed (YES in step S20), the processing proceeds to step S30.

It is noted that, when external power supply is not performed in step S10 (NO in step S10), or when fuel supply is not performed in step S20 (NO in step S20), a series of processing shown in FIG. 4 is finished. Further, the order of the processing of step S10 and the processing of step S20 may be reversed.

In step S30, ECU 300 determines whether or not the second supply path (supply path from engine 100) is selected. When the second supply path is selected (YES in step S30), the processing proceeds to step S40. It is noted that power supply from both of the first supply path (supply path from battery 150) and the second supply path is also possible. Also in this case, the processing proceeds to step S40.

In step S40, ECU 300 stops engine 100, and ECU 300 further prohibits re-driving of engine 100. In addition, ECU 300 prohibits selection of the second supply path, and switches the supply path from the second supply path to the first supply path (step S50). It is noted that the order of the processing of step S40 and the processing of step S50 may be reversed. Thereafter, the processing proceeds to step S60.

Since engine 100 has been driven at the time point of step S30, even if engine 100 is intended to be stopped in step S40, it requires a certain time until engine 100 actually stops. Thus, ECU 300 determines whether or not engine 100 has stopped (step S60).

Specifically, ECU 300 can determine that engine 100 has stopped, for example when engine rotation speed Ne is less than a predetermined value. When engine rotation speed Ne is more than or equal to the predetermined value (NO in step S60), ECU 300 repeatedly performs the processing of step S60 until engine rotation speed Ne becomes less than the predetermined value (YES in step S60). When engine rotation speed Ne becomes less than the predetermined value, the processing proceeds to step S70.

On the other hand, when the second supply path is not selected in step 30, that is, when only the first supply path is selected (NO in step S30), the processing proceeds to step S45.

Since only the first supply path is selected in step S45, it is not necessary to drive engine 100 to supply motive power to first MG 110. However, it is also conceivable that driving of engine 100 is required to play another role (for example, engine warm-up). Thus, ECU 300 prohibits driving of engine 100 (step S45). Thereafter, the processing proceeds to step S70.

In step S70, ECU 300 controls fuel supply lid actuator 650 such that fuel supply lid 640 will be set in an opened state. Thereby, the driver can perform a fuel supply work, that is, a work for inserting fuel supply nozzle 600 into fuel supply port 630.

Here, since the first supply path (supply path from battery 150) is selected while the processing is performed in steps S50, S60, and S70, the SOC decreases gradually. Therefore, in step S80, ECU 300 determines whether or not the SOC is less than a predetermined value LL. As predetermined value LL, a lower limit value of the SOC which allows power supply from battery 150 (for example, a value set beforehand to prevent battery 150 from reaching an overdischarged state) can be used. When the SOC is less than predetermined value LL (YES in step S80), ECU 300 stops external power supply (step S85). On the other hand, when the SOC is more than or equal to predetermined value LL (NO in step S80), the processing proceeds to step S90.

In step S90, ECU 300 determines whether or not fuel supply has been finished. ECU 300 can determine that fuel supply has been finished, for example when the signal from the sensor (not shown) of fuel supply lid actuator 650 indicates that fuel supply lid 640 is in a closed state. When fuel supply has not been finished (NO in step S90), the processing returns to step S80. On the other hand, when fuel supply has been finished (YES in step S90), the processing proceeds to step S100.

In step S100, ECU 300 permits driving of engine 100, and permits selection of the second supply path (see, for example, time t3 in FIG. 3). Thereby, engine 100 is driven and the supply path is switched from the first supply path to the second supply path, when needed. When step S100 is finished, a series of processing shown in FIG. 4 is finished.

As described above, according to the present embodiment, when supply of the fuel is performed during external power supply, driving of engine 100 is prohibited (see step S40). Therefore, a fuel supply work can be prevented from being performed simultaneously while engine 100 is driven. When driving of engine 100 is prohibited, it is not possible to supply electric power through the second supply path (supply path from engine 100). However, external power supply is continued by supplying electric power through the first supply path (supply path from battery 150). Since supply of the electric power stored in battery 150 is not influenced by fuel supply, external power supply can be stably performed also during fuel supply.

In addition, since the time required for fuel supply is generally short (about several minutes), there is a low possibility that the SOC of battery 150 significantly decreases and external power supply cannot be continued during fuel supply. External power supply using the electric power generated by the power generator (first MG 110) can be resumed by re-driving engine 100 after fuel supply is finished (see step S100). Therefore, external power supply can be performed for a long period of time.

Furthermore, according to the present embodiment, the fuel supply lid is in a closed state until engine 100 stops, and after engine 100 stops, fuel supply lid 640 is set in an opened state, which allows a fuel supply work to be performed (see steps S60, S70). Therefore, a fuel supply work can be more reliably prevented from being performed while the engine is driven.

In addition, according to the present embodiment, when the SOC becomes less than predetermined value LL in a case where the supply path from battery 150 is selected, external power supply is stopped (see steps S80, S85). Thereby, deterioration of the battery can be prevented by setting a value which prevents the battery from reaching an overdischarged state, as predetermined value LL.

Finally, the present embodiment will be summarized with reference to FIG. 1 again. Vehicle 1 is configured to perform external power supply which supplies electric power to outside of the vehicle. Vehicle 1 includes battery 150, engine 100, first MG 110 configured to generate electric power using motive power of engine 100, fuel supply port 630 for supplying a fuel for engine 100, and ECU 300 for controlling an external power supply operation. When fuel supply into fuel supply port 630 is performed during the external power supply, ECU 300 prohibits driving of engine 100, and supplies electric power stored in battery 150 to the outside of the vehicle.

Preferably, vehicle 1 further includes openable and closable fuel supply lid 640 for fuel supply port 630, and fuel supply lid switch 660 configured to accept an operation for setting fuel supply lid 640 in an opened state. When fuel supply lid switch 660 accepts the above operation, ECU 300 determines that the fuel supply into fuel supply port 630 will be performed.

Preferably, when fuel supply lid switch 660 accepts the above operation, ECU 300 controls fuel supply lid actuator 650 such that fuel supply lid 640 will be set in the opened state after engine 100 stops.

Preferably, when the fuel supply into fuel supply port 630 is finished during the external power supply, ECU 300 permits the driving of engine 100, and allows supply of the electric power generated by first MG 110 to the outside of the vehicle.

In a control method for vehicle 1, vehicle 1 is configured to perform external power supply which supplies electric power to outside of the vehicle. Vehicle 1 includes battery 150, engine 100, first MG 110 configured to generate electric power using motive power of engine 100, and fuel supply port 630 for supplying a fuel for engine 100. The control method includes the steps of: determining (S20) whether or not fuel supply into fuel supply port 630 will be performed; prohibiting (S40) driving of engine 100 when it is determined that the fuel supply into fuel supply port 630 will be performed during the external power supply; and supplying (S50) electric power stored in battery 150 to the outside of the vehicle when it is determined that the fuel supply into fuel supply port 630 will be performed during the external power supply.

It should be understood that the embodiment disclosed herein is illustrative and non-restrictive in every respect. The scope of the present invention is defined by the scope of the claims, rather than the description above, and is intended to include any modifications within the scope and meaning equivalent to the scope of the claims.

REFERENCE SIGNS LIST

1: vehicle; 100: engine; 102: engine rotation speed sensor; 110: first MG; 120: second MG; 130: motive power split device; 140: drive wheels; 150: battery; 152: battery sensor; 160: PCU; 161: converter; 162, 163: inverter; 170: SMR; 180: DC/AC converter; 182: relay; 500: external device; 510: power supply socket; 540: power supply lid; 550: power supply lid actuator; 560: power supply lid switch; 600: fuel supply nozzle; 610: fuel tank; 620: fuel pipe; 630: fuel supply port; 640: fuel supply lid; 650: fuel supply lid actuator; 660: fuel supply lid switch.

The invention claimed is:

1. A hybrid vehicle configured to perform external power supply which supplies electric power to outside of the hybrid vehicle, comprising:
   a power storage device;
   an internal combustion engine;
   a power generator configured to generate electric power using motive power of said internal combustion engine;
   a fuel supply port for supplying a fuel for said internal combustion engine; and
   a controller configured to control an external power supply operation, when fuel supply into said fuel supply port is performed during the external power supply, said controller prohibiting driving of said internal combustion engine, and supplying electric power stored in said power storage device to the outside of the hybrid vehicle.

2. The hybrid vehicle according to claim 1, further comprising:
an openable and closable lid portion for said fuel supply port; and
a switch configured to accept an operation for setting said lid portion in an opened state,
wherein, when said switch accepts said operation, said controller determines that the fuel supply into said fuel supply port will be performed.

3. The hybrid vehicle according to claim 2, wherein, when said switch accepts said operation, said controller controls said lid portion such that said lid portion will be set in said opened state after said internal combustion engine stops.

4. The hybrid vehicle according to claim 1, wherein, when the fuel supply into said fuel supply port is finished during the external power supply, said controller permits the driving of said internal combustion engine, and allows supply of the electric power generated by said power generator to the outside of the hybrid vehicle.

5. A control method for a hybrid vehicle configured to perform external power supply which supplies electric power to outside of the hybrid vehicle, the hybrid vehicle including a power storage device, an internal combustion engine, a power generator configured to generate electric power using motive power of said internal combustion engine, and a fuel supply port for supplying a fuel for said internal combustion engine, the control method comprising the steps of:

determining whether or not fuel supply into said fuel supply port will be performed;

prohibiting driving of said internal combustion engine when it is determined that the fuel supply into said fuel supply port will be performed during the external power supply; and supplying electric power stored in said power storage device to the outside of the hybrid vehicle when it is determined that the fuel supply into said fuel supply port will be performed during the external power supply.

* * * * *